US010158497B2

(12) United States Patent
Harris et al.

(10) Patent No.: US 10,158,497 B2
(45) Date of Patent: *Dec. 18, 2018

(54) SYSTEM AND METHOD FOR GENERATING AND MANAGING GEOFEED-BASED ALERTS (71) Applicant: TAI Technologies, Inc., Naples, FL (US)

(72) Inventors: Philip B. Harris, Naples, FL (US); Scott K. Mitchell, Naples, FL (US); Michael J. Mulroy, Glencoe, IL (US)

(73) Assignee: TAI Technologies, Inc., Naples, FL (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/792,506

(22) Filed: Jul. 6, 2015

(65) Prior Publication Data
US 2015/0381380 A1 Dec. 31, 2015

Related U.S. Application Data (63) Continuation of application No. 14/164,362, filed on Jan. 27, 2014, now Pat. No. 9,077,675, which is a
(Continued)

(51) Int. Cl.
G06F 15/16 (2006.01)
H04L 12/18 (2006.01)
(Continued)

(52) U.S. Cl.
CPC ......... H04L 12/1845 (2013.01); G06Q 50/01 (2013.01); H04L 12/1895 (2013.01);
(Continued)

(58) Field of Classification Search
CPC ......... H04L 43/08; H04L 51/26; H04L 67/22; H04L 51/32
See application file for complete search history.

(56) References Cited

U.S. PATENT DOCUMENTS 6,026,368 A 2/2000 Brown
6,128,655 A 10/2000 Fields
(Continued)

FOREIGN PATENT DOCUMENTS

EP 2187594 A1 5/2010
EP 2293566 A2 3/2011
WO 2009155741 A1 12/2009

OTHER PUBLICATIONS

Chow et al. "Towards Location-based Social Networking Services." LBSN 2010 Proceedings of the 2nd ACM SIGSPATIAL International Workshop on Location Based Social Networks. Nov. 2, 2010. pp. 31-38.*
(Continued)

Primary Examiner — Hitesh Patel
(74) Attorney, Agent, or Firm — Sheppard Mullin Richter & Hampton LLP (57) ABSTRACT The systems and methods described herein relate to monitoring content, generating alerts, determining trends, and communicating notifications related to geofeeds, including content related to geographically definable locations that is aggregated from a plurality of social media or other content providers. The system may monitor the content based on one or more alert parameters that specify alert conditions that when satisfied cause the system to generate an alert, including trending alerts. The system may track an activity as it moves over time. Content may be associated with the activity and monitored such that the activity may be tracked based on the monitored content. Various alerts may be generated based on the tracked activity. The system may communicate notifications that include the alerts, thereby leveraging content from social media or other providers to convey real-time information on subject matter, trends, activities, and/or other information.

18 Claims, 7 Drawing Sheets

Related U.S. Application Data continuation of application No. 13/708,466, filed on Dec. 7, 2012, now Pat. No. 8,639,767.

(51) Int. Cl.
*H04L 12/26* (2006.01)
*H04L 12/58* (2006.01)
*G06Q 50/00* (2012.01)
*H04L 29/06* (2006.01)

(52) U.S. Cl.
CPC .............. *H04L 43/08* (2013.01); *H04L 51/20* (2013.01); *H04L 51/26* (2013.01); *H04L 51/32* (2013.01); *H04L 63/306* (2013.01)

(56) References Cited

U.S. PATENT DOCUMENTS

| | | | |
|---|---|---|---|
| 6,345,256 B1 | 2/2002 | Milsted | |
| 7,076,737 B2 | 7/2006 | Abbott | |
| 7,680,796 B2 | 3/2010 | Yeh | |
| 7,974,983 B2 | 7/2011 | Goeldi | |
| 8,639,767 B1* | 1/2014 | Harris | G06Q 50/01 709/202 |
| 8,812,951 B1 | 8/2014 | White | |
| 9,055,074 B2 | 6/2015 | Harris | |
| 9,077,782 B2 | 7/2015 | Harris | |
| 9,258,373 B2 | 2/2016 | Harris | |
| 9,307,353 B2 | 4/2016 | Harris | |
| 9,317,600 B2 | 4/2016 | Harris | |
| 9,369,533 B2 | 6/2016 | Harris | |
| 9,436,690 B2 | 9/2016 | Harris | |
| 9,443,090 B2 | 9/2016 | Harris | |
| 9,479,557 B2 | 10/2016 | Harris | |
| 9,485,318 B1 | 11/2016 | Harris | |
| 9,497,275 B2 | 11/2016 | Harris | |
| 9,619,489 B2 | 4/2017 | Harris | |
| 2002/0029384 A1 | 3/2002 | Griggs | |
| 2002/0128908 A1 | 9/2002 | Levin | |
| 2002/0188669 A1 | 12/2002 | Levine | |
| 2003/0018607 A1 | 1/2003 | Lennon | |
| 2003/0025832 A1 | 2/2003 | Swart | |
| 2003/0040971 A1 | 2/2003 | Freedenberg | |
| 2004/0205585 A1 | 10/2004 | McConnell | |
| 2006/0059227 A1 | 3/2006 | Zimler | |
| 2006/0106778 A1 | 5/2006 | Baldwin | |
| 2007/0294299 A1 | 12/2007 | Goldstein | |
| 2008/0147674 A1 | 6/2008 | Nandiwada | |
| 2008/0189099 A1 | 8/2008 | Friedman | |
| 2009/0210426 A1 | 8/2009 | Kulakov | |
| 2009/0222482 A1 | 9/2009 | Klassen | |
| 2009/0297118 A1 | 12/2009 | Fink | |
| 2010/0010907 A1 | 1/2010 | Dasgupta | |
| 2010/0030648 A1 | 2/2010 | Manolescu | |
| 2010/0079338 A1 | 4/2010 | Wooden | |
| 2010/0083124 A1 | 4/2010 | Druzgalski | |
| 2010/0138553 A1 | 6/2010 | Yuan | |
| 2011/0040894 A1 | 2/2011 | Shrum | |
| 2011/0055176 A1 | 3/2011 | Choi | |
| 2011/0072106 A1 | 3/2011 | Hoffert | |
| 2011/0072114 A1 | 3/2011 | Hoffert | |
| 2011/0113096 A1* | 5/2011 | Long | G06Q 30/02 709/204 |
| 2011/0270940 A1* | 11/2011 | Johnson | G08B 27/006 709/207 |
| 2011/0307307 A1 | 12/2011 | Benmbarek | |
| 2012/0077521 A1 | 3/2012 | Boldyrev | |
| 2012/0101880 A1 | 4/2012 | Alexander | |
| 2012/0109752 A1 | 5/2012 | Strutton | |
| 2012/0124161 A1 | 5/2012 | Tidwell | |
| 2012/0124630 A1 | 5/2012 | Wellen | |
| 2012/0158536 A1 | 6/2012 | Gratton | |
| 2012/0197963 A1 | 8/2012 | Bouw | |
| 2012/0200403 A1 | 8/2012 | Morris | |
| 2012/0209826 A1 | 8/2012 | Belimpasakis | |
| 2012/0233158 A1 | 9/2012 | Braginsky | |
| 2012/0239763 A1 | 9/2012 | Musil | |
| 2012/0317482 A1 | 12/2012 | Barraclough | |
| 2013/0054672 A1 | 2/2013 | Stilling | |
| 2013/0060744 A1 | 3/2013 | Roychoudhuri | |
| 2013/0060796 A1 | 3/2013 | Gilg | |
| 2013/0073389 A1 | 3/2013 | Heath | |
| 2013/0110641 A1 | 5/2013 | Ormont | |
| 2013/0124437 A1 | 5/2013 | Pennacchiotti | |
| 2013/0131918 A1 | 5/2013 | Hahne | |
| 2013/0132194 A1 | 5/2013 | Rajaram | |
| 2013/0159519 A1 | 6/2013 | Hochberg | |
| 2013/0262168 A1 | 10/2013 | Makanawala | |
| 2013/0290207 A1 | 10/2013 | Bonmassar | |
| 2013/0290554 A1 | 10/2013 | Chen | |
| 2013/0317975 A1 | 11/2013 | Gage | |
| 2013/0325964 A1 | 12/2013 | Berberat | |
| 2014/0020034 A1 | 1/2014 | Manchester | |
| 2014/0025911 A1 | 1/2014 | Sims | |
| 2014/0040371 A1 | 2/2014 | Gurevich | |
| 2014/0143346 A1 | 5/2014 | Mahmud | |
| 2014/0162692 A1 | 6/2014 | Li | |
| 2014/0195918 A1 | 7/2014 | Friedlander | |
| 2014/0222950 A1 | 8/2014 | Rabel | |
| 2014/0236882 A1 | 8/2014 | Rishe | |
| 2014/0297740 A1 | 10/2014 | Narayanan | |
| 2015/0019648 A1 | 1/2015 | Harris | |
| 2015/0019866 A1 | 1/2015 | Braness | |
| 2015/0020208 A1 | 1/2015 | Harris | |
| 2015/0032739 A1 | 1/2015 | Harris | |
| 2015/0172396 A1 | 6/2015 | Longo | |
| 2015/0256632 A1 | 9/2015 | Harris | |
| 2015/0381380 A1 | 12/2015 | Harris | |
| 2016/0006783 A1 | 1/2016 | Harris | |
| 2016/0014219 A1 | 1/2016 | Harris | |
| 2016/0182656 A1 | 6/2016 | Harris | |
| 2016/0219403 A1 | 7/2016 | Harris | |
| 2016/0232182 A1 | 8/2016 | Harris | |
| 2016/0283561 A1 | 9/2016 | Harris | |
| 2017/0032384 A1 | 2/2017 | Harris | |
| 2017/0041365 A1 | 2/2017 | Harris | |
| 2017/0046355 A1 | 2/2017 | Harris | |
| 2017/0064017 A1 | 3/2017 | Harris | |

OTHER PUBLICATIONS

U.S. Appl. No. 13/788,843, a Notice of Allowance, dated Dec. 3, 2015, 18 pages.
U.S. Appl. No. 14/500,881, a non-final Office Action, dated Sep. 21, 2015, 5 pages.
U.S. Appl. No. 14/089,631, a Notice of Allowance, dated Feb. 2, 2015, 10 pages.
U.S. Appl. No. 14/180,473, a Notice of Allowance, dated Jan. 27, 2015, 8 pages.
U.S. Appl. No. 14/180,845, a final Office Action, dated Feb. 22, 2016, 43 pages.
U.S. Appl. No. 14/180,845, a non-final Office Action, dated Aug. 27, 2015, 43 pages.
U.S. Appl. No. 14/180,845, a non-final Office Action, dated Jul. 7, 2016, 51 pages.
U.S. Appl. No. 14/215,612, a non-final Office Action, dated Aug. 18, 2015, 27 pages.
U.S. Appl. No. 14/500,832, a non-final Office Action, dated May 21, 2015, 13 pages.
U.S. Appl. No. 14/500,881, a non-final Office Action, dated Dec. 21, 2015, 24 pages.
U.S. Appl. No. 14/512,293, a Final Office Action, dated Apr. 6, 2016, 9 pages.
U.S. Appl. No. 14/512,293, a final Office Action, dated Aug. 14, 2015, 15 pages.
U.S. Appl. No. 14/512,293, a non-final Office Action, dated Dec. 9, 2015, 14 pages.
U.S. Appl. No. 14/512,293, a non-final Office Action, dated Jan. 28, 2015, 18 pages.
U.S. Appl. No. 14/666,056, a Final Office Action, dated Jan. 4, 2016, 11 pages.

(56) References Cited

OTHER PUBLICATIONS

U.S. Appl. No. 14/666,056, non-final Office Action, dated Aug. 10, 2015, 17 pages.
U.S. Appl. No. 14/733,715, a Final Office Action, dated Aug. 17, 2016, 21 pages.
U.S. Appl. No. 14/733,715, a non-final Office Action, dated Mar. 11, 2016, 25 pages.
U.S. Appl. No. 14/792,538, a non-final Office Action, dated Feb. 26, 2016, 20 pages.
U.S. Appl. No. 14/813,031, a final Office Action, dated Mar. 21, 2016, 41 pages.
U.S. Appl. No. 14/813,031, a non-final Office Action, dated Aug. 5, 2016, 46 pages.
U.S. Appl. No. 14/813,031, a non-final Office Action, dated Nov. 24, 2015, 23 pages.
U.S. Appl. No. 14/813,039, a Final Office Action, dated May 16, 2016, 14 pages.
U.S. Appl. No. 14/813,039, a non-final Office Action, dated Jan. 20, 2016, 20 pages.
U.S. Appl. No. 15/018,767, a non-final Office Action, dated Jun. 6, 2016, 19 pages.
U.S. Appl. No. 15/130,289, a non-final Office Action, dated Aug. 10, 2016, 42 pages.
U.S. Appl. No. 15/241,836, a non-final Office Action, dated Oct. 7, 2016, 38 pages.

\* cited by examiner

SYSTEM AND METHOD FOR GENERATING AND MANAGING GEOFEED-BASED ALERTS

RELATED APPLICATIONS

This application is a continuation of granted U.S. patent application Ser. No. 14/164,362, filed Jan. 27, 2014, issued as U.S. Patent No. 9,077,675 on Jul. 7, 2015, entitled "SYSTEM AND METHOD FOR GENERATING AND MANAGING GEOFEED-BASED ALERTS", which is a continuation of granted U.S. patent application Ser. No. 13/708,466, filed Dec. 7, 2012, issued as U.S. Patent No. 8,639,767 on Jan. 27, 2014, entitled "SYSTEM AND METHOD FOR GENERATING AND MANAGING GEO-FEED-BASED ALERTS", which are each incorporated by reference herein in its entirety. This application is related to granted U.S. patent application Ser. No. 13/708,516, filed Dec. 7, 2012, issued as U.S. Patent No. 8,655,983 on Feb. 18, 2014, entitled "SYSTEM AND METHOD FOR LOCATION MONITORING BASED ON ORGANIZED GEO-FEEDS", and granted U.S. patent application Ser. No. 13/708,404, filed Dec. 7, 2012, issued as U.S. Patent No. 8,484,224 on Jul. 9, 2013, entitled "SYSTEM AND METHOD FOR RANKING GEOFEEDS AND CONTENT WITHIN GEOFEEDS", both of which are incorporated by reference in their entireties herein.

FIELD OF THE INVENTION

The disclosure relates to systems and methods for monitoring content, generating alerts, determining trends, and communicating notifications related to geofeeds, including content related to geographically definable locations that is aggregated from a plurality of social media or other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

Because of the availability of large amounts of content, identifying trends and alerts in relation to the content may be difficult. Thus, interested parties may not obtain timely notifications of trends or alerts.

These and other problems exist.

SUMMARY OF THE INVENTION

The disclosure relates to systems and methods for monitoring content, generating alerts, determining trends, and communicating notifications related to geofeeds, including content related to geographically definable locations that is aggregated from a plurality of social media or other content providers.

In some embodiments, the system may include a computer that includes one or more processors configured to perform some or all of a functionality of a plurality of modules. For example, the one or more processors may be configured to execute a geofeed creation module, an alert module, a tracking module, a communication module, a user interface module, an alert management module, and/or other modules.

The geofeed creation module may be configured to receive a request to create a geofeed based on a specification of one or more geo-locations. The request may include one or more geofeed parameters, one or more alert parameters and/or other parameters. The one or more geofeed parameters may be used to filter content into the geofeed and/or out of the geofeed. The alert parameters may specify one or more alert conditions that when satisfied trigger an alert for the geofeed.

The geofeed creation module may generate a geofeed definition that includes the specification of the one or more geo-locations, the one or more geofeed parameters, the one or more alert parameters, and/or other information related to the geofeed. The geofeed definition may be updated. For example, the specification of the one or more geo-locations, the one or more geofeed parameters, the one or more alert parameters, and/or other information of the geofeed definition may be updated. In this manner, various parameters related to geofeeds may be defined or updated at the time of specifying the geofeeds and/or after the geofeeds have been specified.

To create the geofeed, the geofeed creation module may obtain the specification of the one or more geo-locations from the geofeed definition and generate requests that specify the one or more geo-locations specifically for individual ones of the plurality of content providers. In some embodiments, the geofeed creation module may create a single geofeed having a plurality of geo-locations that are grouped with respect to one another. In other embodiments, the geofeed creation module may create multiple distinct geofeeds, which may each be associated with one or more geo-locations that are grouped with respect to one another. In these embodiments, each set of individual content may correspond to a single geofeed.

The alert module may be configured to monitor content and generate alerts for a geofeed based on the monitored content and the alert parameters that specify alert conditions. The alert conditions may include, for example, a volume alert condition (e.g., an increase such as a spike in the volume of content), a subject matter alert condition (e.g., a particular keyword appearing in the content), a temporal alert condition (e.g., specified content being published, created, etc., during a specified time period), a trend alert condition (e.g., an content that is trending with respect to geofeeds, external search engines, etc.), and/or other alert conditions.

In some embodiments, the alert module may be configured to monitor a cluster of content that share similar topics and/or other attributes. For example, a cluster of content may be related to "schools." In this example, the cluster of content may be related to teachers, students, curricula, and/or other information related to schools.

In some embodiments, tracking module may be configured to track an activity over time. The activity may move over time along a path of locations. The tracking module may associate the content with the activity and monitor the content to track the activity based on the monitored content. For example, users may be interested in tracking the progress of a storm. The content may be associated with the activity such that the tracking module may create a geofeed or otherwise obtain content related to the storm over time. As the storm moves, the tracking module may monitor and track content related to the storm over time.

The communication module may be configured to communicate one or more notifications that include geofeed-based alerts via one or more communication channels. The user interface module may be configured to generate a user interface that displays geofeed-based alerts, tracking information, and/or other information related to geofeeds.

The alert management module may be configured to create, configure, update, modify, remove, or otherwise manage alert parameters. For example, the alert management module may be configured to define alert parameters after a geofeed definition has been created and cause the alert parameters to be added to the geofeed definition and/or may update alert parameters for alerts that were already defined.

In some embodiments, the alert management module may facilitate subscriptions to a defined alert. For example, a user may subscribe via the alert management module to one or more geofeed-based alerts that have already been defined (e.g., by the user and/or other users). When the alert module generates and/or issues an alert based on defined alert, a notification that includes the alert may be communicated to users who subscribed to the defined alert.

In some embodiments, the geofeed creation module and/or the alert management module alert may generate an alert definition that identifies one or more geofeeds to be monitored and includes one or more alert parameters. An alert definition allows alerts to be defined without updating corresponding geofeed definitions.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

Figure 1:
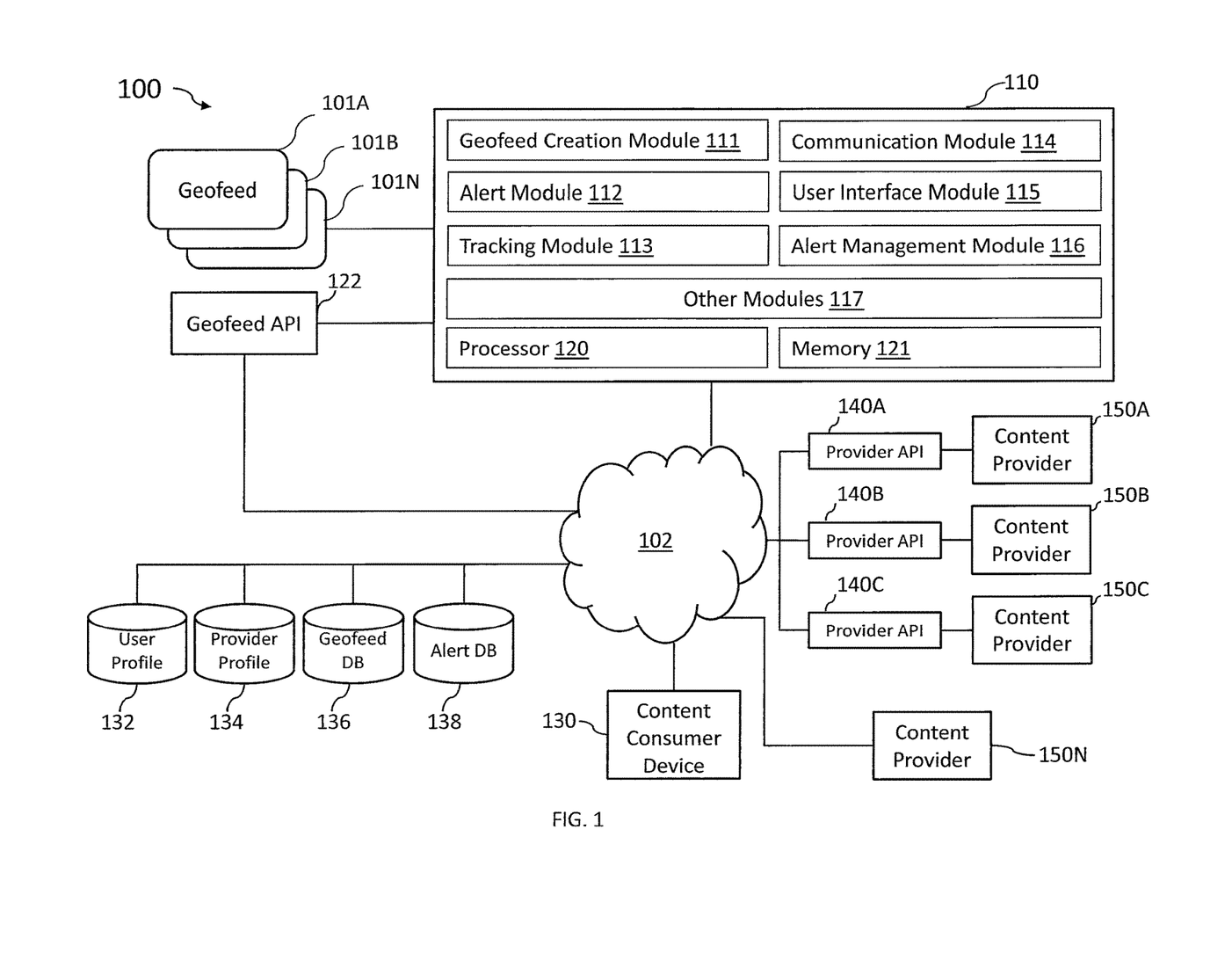
FIG. 1 illustrates a system of monitoring content, generating alerts, determining trends, and communicating notifications related to geofeeds, according to an aspect of the invention.

FIG. 1 illustrates a system 100 of monitoring content, generating alerts, determining trends, and communicating notifications, according to an aspect of the invention. A geofeed includes a collection of content, aggregated from various content providers, that is relevant to a geographically definable location (hereinafter, a "geo-location"). The content (also referred to herein as "geofeed content") may include, for example, video, audio, images, text, hyperlinks, and/or other content that may be relevant to a geo-location. The content providers may include, for example, social media platforms (e.g., FACEBOOK, TWITTER, INSTAGRAM, FLICKR, etc.), online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content. As used hereinafter, "a location," "a geo-location," "a geographically definable location," and similar language is not limited to a single location but may also refer to one or more such locations.

In many instances the created content can be automatically tagged with information such as user identifications, date/time information or geographic information that specifies a location where the content was created. For example, cameras equipped with Global Positioning Satellite ("GPS") units or other location-aware systems may embed into an image file latitude/longitude coordinates that indicate where a picture was taken. In addition, modern hand-held devices such as smartphones may be equipped with a GPS sensor, which allows users to generate content (text, photos and videos) with their devices and immediately share the content through a plurality of social networks. Moreover, some devices allow users to manually input the foregoing and other information for embedding into the content. Furthermore, editing software may allow a user to embed or otherwise associate information along with the content after the content was created.

As used herein, "monitor a geofeed" may include monitoring content of a geofeed and/or monitoring content related to one or more geo-locations.

System 100 may include a computer 110, a geofeed API 122, a content consumer device 130, provider APIs 140, content providers 150, and/or other components. In some embodiments, computer 110 may include one or more processors configured to perform some or all of a functionality of a plurality of modules. For example, the one or more processors may be configured to execute a geofeed creation module 111, an alert module 112, a tracking module 113, a communication module 114, a user interface module 115, an alert management module 116, and/or other modules 117.

Geofeed creation module 111 may be configured to create one or more geofeeds 101 (illustrated in FIG. 1 as geofeed 101A, 101B, ..., 101N), as described in granted U.S. patent application Ser. No. 13/284,455, filed Oct. 28, 2011, issued as U.S. Patent No. 8,655,873 on Feb. 18, 2014, entitled "SYSTEM AND METHOD FOR AGGREGATING AND DISTRIBUTING GEOTAGGED CONTENT," and granted U.S. patent application Ser. No. 13/619,888, filed Sep. 14, 2012, issued as U.S. Patent No. 8,595,317 on Nov. 26, 2013, entitled "SYSTEM AND METHOD FOR GENERATING, ACCESSING, AND UPDATING GEOFEEDS" both of which are incorporated by reference herein in their entirety.

For example, geofeed creation module 111 may format a request for a geofeed specific for different provider APIs 140 (illustrated in FIG. 1 as API 140A, 140B, ..., 140N). The provider APIs may facilitate receiving content from corresponding content providers 150 (illustrated in FIG. 1 as content providers 150A, 150B, 150C). In some embodiments, geofeed creation module 111 may format a request directly for content provider 150N without using a corresponding API. Formatting instructions may be stored at a provider profile 134. A content consumer device 130 may request and view geofeeds 101 created by geofeed creation module 111. Geofeeds 101 created by geofeed creation module 111 may be stored in and/or retrieved from a geofeed database 136 and/or any other database linked to computer 110.

Alert module 112 may be configured to monitor a geofeed based on one or more alert conditions that when satisfied cause a geofeed-based alert to be generated. The alert conditions may include, for example, a volume alert condition (e.g., an increase such as a spike in the volume of content), a subject matter alert condition (e.g., a particular keyword appearing in the content), a temporal alert condition (e.g., specified content appearing during a specified time period), a trend alert condition (e.g., content that is trending with respect to geofeeds, external search engines, etc.), and/or other alert conditions.

In some embodiments, alert module 112 may be configured to monitor a geofeed based on one or more volume alert parameters that specify volume alert conditions. Volume alert conditions may be satisfied when new content (e.g., a new TWITTER post) is posted and/or when there is an increase or spike in the number of content that appears over a predefined and configurable period of time in one or more geo-locations that are related to the geofeed. The volume alert parameter may specify a threshold volume of content based on a particular number and/or particular percentage increase. The threshold volume of content may be automatically determined by the system based on average volumes of content, specified by a user, and/or be otherwise be configurable. Alert module 112 may generate an alert when new content is available and/or when the volume of content exceeds the threshold volume of content.

In some embodiments, alert module 112 may determine when volume has increased based on a comparison of a current volume of content and a historical volume of content. For example, when the current volume of content (e.g., content for the past hour or other time period) related to a geofeed increases by a certain percentage (e.g., 20%) relative to its historical 30-day average, alert module 112 may generate an alert. Alert module 112 may determine a historical activity level by obtaining, for example, an average number of newly available geofeed content items per hour calculated over a certain time period (e.g., a 30-day period). The current level of activity may be measured by counting the number of newly available geofeed content items for the past hour or other time period.

Alert module 112 may compare the current activity level to the historical 30-day average and if it determines that the current activity level exceeds the historical level (or exceeds by a predetermined threshold), an alert may be generated and/or triggered. For example, when the average number of content items posted per hour in a particular geofeed for the past 30-day period is five, alert module 112 may generate an alert upon detecting that the current activity level exceeds five. On the other hand, if the current activity level is below the historical average number of content, no alert is generated.

In this manner, alert module 112 facilitates real-time alerts based on volume of content. For example, users may quickly and easily obtain real-time content updates without having to constantly check multiple sources of content (e.g., various social media platforms) for new content. In a particular non-limiting example, news providers may be interested in receiving real-time content that may be newsworthy. The news providers may specify one or more geofeeds that cover geo-locations of interest and a volume alert parameter to monitor the specified geofeeds. Alert module 112 may monitor content of the one or more geofeeds and determine an availability of new content and/or an increase in the volume of content within a particular time period that satisfies the volume alert parameter. Thus, the news providers may obtain real-time leads on potentially developing stories to target where reporters should be sent to further investigate.

In some embodiments, alert module 112 may be configured to monitor a geofeed based on subject matter alert parameters that specify subject matter alert conditions. Subject matter alert conditions may be satisfied when particular subject matter appears in content. Alert module 112 may identify when subject matter appears in content based on subject matter indicators related to the content. Subject matter indicators may include, for example, a particular keyword (or set of keywords) used in relation to content (e.g., a HASHTAG, words appearing in a FACEBOOK post, etc.), certain images used in relation to content, and/or other subject matter indicators. Thus, alert module 112 may be configured to generate alerts when specified subject matter appears in content related to geofeeds. For example, a system administrator may want to be alerted about inappropriate content (such as profanity, offensive images, etc.) so that such content can be immediately removed from the geofeeds.

In some embodiments, alert module 112 may monitor the geofeed based on the keywords related to particular subject matter, topics, and/or activity and generate an alert in response to detecting that one or more of the keywords appear in the geofeed content. For example, a user may wish to receive alerts on criminal activity happening around his or her home. Subject matter alert parameters that specify keywords related to criminal activity such as "robbery," "gun," etc. may be specified by the user and/or automatically in order to provide such subject matter alerts.

In some embodiments, alert module 112 may be configured to receive a keyword library that specifies one or more keywords. For example, a user may generate a list of keywords for which an alert should be generated. The keywords of the keyword library may be related to certain activities that a user wishes to monitor. For example, law enforcement may wish to monitor gang activity at one or more geo-locations. Certain words, phrases, symbols, numbers, etc., may indicate gang activity at the one or more geo-locations and these may be included in the keyword library. For example, a particular gang may use code words or "gang speak" known by law enforcement that identify that particular gang's activity. Another gang may use other code words that identify its activity. Certain other keywords may generically indicate gang activity such as "gang," "gun," "drugs," etc. Different keyword libraries may be used to monitor different gangs and/or a single keyword library may be used to monitor all gangs.

The keyword library may be stored in alert database 138 and/or any other database. In this manner, the keyword library may be obtained dynamically and/or from storage in order to provide alerts based on the keyword library.

Alert module 112 may detect an increase (and/or spike) in the usage of a particular keyword (or set of keywords) by monitoring frequency of usage of the keyword (or set of keywords) in the geofeed content within a particular geofeed. Alert module 112 may obtain a historical keyword frequency (e.g., the average number of social media posts with the keyword "storm" per day for the past 30-day period) and compare it to the current keyword frequency. For example, when the historical 30-day average frequency of the keyword "storm" has been 5 content items per day, alert module 112 may generate an alert upon detecting that the current keyword frequency for the past 24 hours has increased by a certain percentage (e.g., 20%) relative to its historical 30-day average.

For example, for first responders and disaster response teams, it may be critical to receive timely notification of emergency situations that call for immediate actions. In some embodiments, the emergency situations may include natural disasters (e.g., earthquake, tornados, hurricanes, etc.), fire, flood, major accidents, etc. Once the first responders specify a geographical region to be monitored, alert module 112 may obtain one or more geofeeds within the specified region and monitor the geofeed content. The geofeeds generated may cover a small city, a bigger region such as the North America region, and/or multiple locations like earthquake-prone areas. Alert module 112 may detect an increase in the usage of the particular keyword (or set of keywords) (e.g., "earthquake") in the geofeed content. In this case, an alert may be generated to notify the first responders of the geofeed content related to earthquake in the geographical region they specified. In this manner, the first responders and disaster response teams may quickly and easily obtain initial reports in order to direct responders to appropriate locations that may be identified by the geofeed content.

In some embodiments, alert module 112 may be configured to monitor a geofeed based on temporal alert parameters that specify temporal alert conditions. The temporal alert conditions may be satisfied when a time related to particular content such as a creation time, a publication time, etc., occurs at a particular time period. Temporal alert parameters may specify a time period for monitoring the geofeed such as a certain date (and/or time) range, business days (i.e., Monday to Friday), weekends (i.e., Saturday and Sunday), rush hours, holidays, and/or other time periods. For example, a user who commutes to work during rush hours may be interested in receiving alerts regarding road blocks, car accidents, road constructions, and/or unexpected traffic jams that may be happening along his commute. During a time period specified by the temporal alert parameters (e.g., a specified commute time, rush hour, etc.), alert module 112 may monitor content related to one or more geofeeds related to geo-locations corresponding to the path of the commute. In another example, a content consumer may want to receive information related to special sales promotions during particular dates such as birthdays or holidays. In this example, during the specified time period, alert module 112 may monitor content related to one or more geofeeds related to geo-locations corresponding to shopping malls.

In some embodiments, alert module 112 may be configured to monitor a cluster of content that share similar topics and/or other attributes. Content related to different locations may be grouped into a cluster by one or more common attributes such as a type of location, keyword (or set of keywords), and/or time. For example, teachers, students, and/or school employees may be interested in receiving content originated from locations within school zones where a school zone may include an area within a radius of a certain miles centered about the school. A cluster of content may be formed by grouping content based on a type of location such as "school" from which individual content items have been originated. Alert module 112 may obtain and/or monitor a plurality of geofeeds where individual ones of the geofeeds may include content originating from corresponding school zones and/or having subject matter related to schools.

In some embodiments, alert module 112 may be configured to generate an alert based on one or more trend alert parameters that specify trend alert conditions. In some embodiments, alert module 112 may monitor trends in one or more geo-locations specified by content consumers when requesting to create and/or retrieve a geofeed. Alert module 112 may determine that one or more geo-locations are "trending" based on a frequency of requests to create and/or retrieve a geofeed for those geo-locations. In this example, the trend alert parameters may specify the particular frequency of requests such that the trend alert conditions may be satisfied when one or more particular geo-locations have been recently specified by content consumers during one or more recent time periods at volumes (or numbers) greater than the particular frequency. In some embodiments, the trend alert parameters may specify the one or more geo-locations (e.g., particular geo-coordinates, a particular place name such as "Empire State Building," etc.), the one or more recent time periods, the one or more previous time periods, and/or other conditions.

In some embodiments, alert module 112 may detect a trend based on one or more common geo-locations. Common geo-locations may include geo-locations that at least partially overlap and/or coincide with other geo-locations. For example, the geo-location of the Empire State Building at least partially overlaps and/or coincides with the geo-location corresponding to New York City. In this example, the geo-location corresponding to "New York City" may be determined to be trending based on geofeed requests related to "Empire State Building" and/or other geo-locations or subject matter related to "New York City."

In some embodiments, the trend alert conditions may be satisfied when particular subject matter has been recently appearing in content during one or more recent time periods at volumes (or numbers) greater than one or more previous time periods. The trend alert parameters may specify the subject matter, the one or more recent time periods, the one or more previous time periods, and/or other conditions.

In some embodiments, the trend alert conditions (e.g., the common geo-locations, the subject matter, the one or more recent time periods, the one or more previous time periods, and/or other conditions) may be determined manually by a user and/or automatically by the system.

In some embodiments, alert module 112 may determine that trend alerts for one or more geofeeds should be activated based on a geofeed definition, an alert definition, and/or other parameters. In some embodiments, alert module 112 may automatically process content of one or more geofeeds to which the system has access (or has created) to generate trends in content of the geofeeds at predetermined intervals such as on a nightly basis. In some embodiments, alert module 112 may generate a historical trend in which a trend may be determined based on a historical start point to a historical end point. Similarly, alert module 112 may automatically process one or more geofeed definitions to generate trends in geo-location specifications at predetermined intervals and/or to generate a historical trend in which a trend may be determined based on a historical start point to a historical end point.

In a non-limiting example of a trend, a movie may be released at a particular date. Both before and after the particular date, a trend for the movie may appear in content related to one or more geofeeds in that users may be TWEETING or otherwise creating content related to the movie. Prior to trailers for the movie being released, the movie may not have been trending because users were unaware of the existence of the movie or were otherwise uninterested. In this example, alert module 112 may detect the trend, generate a trend alert, and generate a notification related to the trend alert.

In some embodiments, alert module 112 may detect the trend based on one or more trend alert parameters specified by a user such as a movie producer who wishes to determine whether and how the movie may be trending in relation to one or more geofeeds. In some embodiments, alert module 112 may detect the trend automatically based on processing content from geofeeds on a nightly basis. For example, alert module 112 may automatically detect that certain keywords (such one or more words from the movie title) appear in content of geofeeds to which the system has access and that the keywords have been appearing in more recent content.

In some embodiments, alert module 112 may determine subject matter for trends based on information from third party sources such as third party source engines and automatically determine trend alerts in relation to geofeeds based on the trend information from third party sources.

In some embodiments, alert module 112 may be configured to generate an alert based on a historical, current, and/or future (e.g., predicted) behavior of a user. Behaviors may include, for example, creating and/or posting content on social media platforms, viewing or otherwise responding to promotions such as advertisements, redeeming coupons, and/or other behaviors. For example, a retailer that creates a geofeed covering its store location may wish to receive an alert based on a behavior of the user. In this example, the user may post or otherwise create content while shopping in the store. Alert module 112 may detect the arrival of new content in the geofeed and alert the retailer. The retailer may transmit an electronic coupon in real-time to this shopper based on the alert. Alert module may be notified of the redemption and may generate an alert and/or store such notification. For example, the retailer may annotate the created or posted content to indicate that the customer has redeemed a coupon, thereby informing the system that the coupon was redeemed. In some implementations, the system may interface directly with a retailer system in order to receive indications of such coupon redemptions (and/or other user behavior such as purchases for which the retailer system is aware).

In some embodiments, alert module 112 may track this behavior of the customer (e.g., the behavior of being responsive to the coupon) and associate it with the customer and/or the content posted by the customer. In this way, when the customer makes a subsequent visit to the store and posts content via a content provider, alert module 112 may generate an alert which may inform the retailer to produce coupons and/or other promotions to the customer based on the behavior of the customer. In some embodiments, a geofeed-based alert may be generated while monitoring one or more geofeeds based on a combination of two or more alert parameters discussed herein. For example, alert module 112 may be configured to generate an alert "when the volume of geofeed content is unusually high" (e.g., a volume alert condition) and "during business days" (e.g., a temporal alert condition). Other combinations of alert conditions may be used to generate a geofeed-based alert as well. In a sense, a trending alert in some embodiments may be considered a combination of a subject matter alert and a volume alert in that particular subject matter appearing in content with an increasing volume of current activity may cause a trend alert to be generated. It should be noted that trending alert parameters may be combined with other alert parameters.

In some embodiments, alert module 112 may generate an alert notification when an alert is no longer relevant. For example, an alert notification may be generated when a subject matter is no longer appearing in content, when a trend is no longer trending, and/or other times when a geofeed-based alert is no longer be relevant.

In some embodiments, tracking module 113 may be configured to track an activity over time. The activity may move over time along a path of locations. The activity to be tracked may be specified in various ways such as by user input, automatically determined by tracking module 113, and/or ways to specify an activity to be tracked. A user may specify the activity to be tracked such as by entering one or more geo-locations related to the activity, specifying the subject matter of the activity to be tracked, and/or other information that specifies the activity to be tracked. Tracking module 113 may automatically determine the activity to track based on alerts described herein and/or information that may be accessible by the system.

Tracking module 113 may associate the content with the activity and monitor the content to track the activity based on the monitored content. For example, users may be interested in tracking the progress of a storm. The content may be associated with the activity such that tracking module 113 may create a geofeed or otherwise obtain content related to the storm over time. As the storm moves, tracking module 113 may monitor and track content related to the storm over time.

In some embodiments, content may be associated with the activity based on subject matter of the content determined in a manner similar to subject matter alerts. For example, content may be associated with a storm based on a keyword "storm," a name of the storm, and/or other words that may relate to the storm. Various functions and features related to how to detect an increase (and/or spike) in the usage of a particular keyword (or set of keywords) in geofeed content are as described above with respect to the subject matter alert conditions.

In some embodiments, tracking module 113 may track movement of the activity in various ways. For example, tracking module 113 may automatically track the movement by sampling one or more candidate geo-locations in a vicinity around a one or more first geo-locations (e.g., where the storm first made landfall) to identify geo-locations (which may correspond to pre-existing, newly created, system-generated, and/or other geofeeds) that may correspond to the movement of the activity. When the frequency of usage of one or more keywords related to a candidate geo-location has increased by a predetermined percentage in a certain location relative to its historical keyword frequency (e.g., the average number of social media posts with the keyword "storm" per day for the past 30-day period), tracking module 113 may select the candidate geo-location as the next geo-location and repeat the process using other candidate geo-locations around the selected candidate geo-location. In this manner, tracking module 113 may automatically associate content with the activity as the activity moves.

In some embodiments, a direction of the "motion" of content may be determined by comparing information such as meta-data related to the geofeed content. For example, tracking module 113 may compare the creation time (and/or update time) of content and arrange the content in chronological order to determine the direction of content movement over time.

In some embodiments, tracking module 113 may sample a larger geographical region (e.g., county, city, etc.) covering the original geofeed being tracked by tracking module 113 and monitor the bigger region to understand how the geofeed content moves within that region. Tracking module 113 may capture multiple snapshots (and/or views) of the region, each of the snapshots corresponding to individual ones of a plurality of consecutive time segments. For example, when it is determined that there is an increase in the volume of content in the original geofeed being tracked in the first time segment (e.g., 9:00 AM-9:30 AM), tracking module 113 may identify a bigger region that covers the original geofeed and capture a snapshot of content distribution of the region in the second time segment (e.g., 10:00 AM-10:30 AM), another snapshot in the third time segment (e.g., 10:30 AM-11:00 AM) and so on. Using these time-based snapshots of content distribution, tracking module 113 may determine that there is a spike in the activity level (e.g., an increase in the volume of geofeed content) in one subsection of the region in the second time segment, another spike in another subsection of the region in the third time segment and so on. In this manner, tracking module 113 may determine certain "motion" of geofeed content along a certain path of locations over time.

In some embodiments, tracking module 113 may track the movement of the activity based on inputs by a user or process such as an automated process that provides coordinate updates of the activity. A system administrator or other user may input various geo-locations that correspond to the actual storm's movement. In this manner, various geo-locations corresponding to the track of the storm may be entered by the user so that the system may generate one or more geofeeds and/or one more geofeed alerts based on the entered information.

One of ordinary skill in the art will appreciate that tracking module 113 may also track the motion of geofeed content based on monitoring one or more geofeeds for an increase (and/or spike) in the volume of geofeed content (e.g., the number of social media posts) in a certain location. Various functions and features related to how to detect an increase in the usage of a particular keyword (or set of keywords) are as described above with respect to the content based alert conditions.

In some embodiments, tracking module 113 may predict an expected path along which geofeed content would be likely to move based on the current path of motion identified by tracking module 113. In some embodiments, alert module 112 may generate a geofeed-based alert based on the tracking information. For example, an alert may be generated to notify content consumers of geofeed content located along the current and/or expected path of motion identified by tracking module 113.

Communication module 114 may be configured to communicate one or more notifications that include geofeed-based alerts generated by alert module 112 discussed herein. The one or more notifications may be communicated via one or more communication channels such as, for example, SMS text, email, content delivered to a client application such as a mobile application, a website, and/or other communication channel. In some embodiments, the geofeed-based alert may be communicated via a user interface such as a web page, mobile application, and/or other interface.

In embodiments, the one or more notifications may be communicated whenever a geofeed-based alert is generated and/or when a certain predefined number of geofeed-based alerts have been generated. For example, communication module 114 may not communicate a notification until there have been 3 alerts (or any other predefined number of alerts) generated. In some embodiments, communication module 114 may communicate the one or more notifications at a particular time interval and/or frequency. For example, when an alert is generated, a notification may be generated every 1 minute until that alert is terminated. In some embodiments, communication module 114 may communicate the notifications at a frequency that changes. For example, notifications may be communicated every fifteen minutes during a first hour, every half hour during a second hour, and hourly thereafter. The changes in frequency may be predefined or otherwise configurable.

User interface module 115 may be configured to generate a user interface that communicates and/or displays geofeed-based alerts. In some embodiments, user interface module 115 may display the movement and/or motion of geofeed content over time as determined by tracking module 113. Exemplary screenshots of interfaces generated by user interface module 115 are illustrated in FIGS. 3-7.

Alert management module 116 may be configured to create, configure, update, modify, remove, or otherwise manage alert subscriptions. A content consumer may subscribe via alert management module 116 to one or more geofeed-based alerts that have been manually created by content consumers and/or system-generated, and stored in an alert database 138. For example, when alert module 112 generates and/or issues an alert based on one or more alert conditions, the alert may be communicated via communication module 114 to those content consumers who subscribed to that particular alert via alert management module 116. Identification information of alert subscribers (e.g., content consumers who subscribed to one or more geofeed-based alerts) may be stored in and/or retrieved from a user profile 132 and/or any other database linked to computer 110.

Alert definition module 117 may be configured to generate alert definitions that are used to create and/or configure a new alert and update, modify, remove, or otherwise manage existing alerts stored in alert database 138. Alert definitions may be manually generated by content consumers and/or system-generated. An alert definition may identify one or more geofeeds to be monitored and include one or more alert conditions that when satisfied cause a geofeed-based alert to be generated for the one or more geofeeds to be monitored. Alert conditions may include volume alert conditions, subject matter alert conditions, temporal alert conditions, and/or various other alert conditions, as would be appreciated. Moreover, alert definitions may specify expiration date and/or time for individual alerts. For example, once a geofeed-based alert is expired, a content consumer who subscribed to the particular alert will no longer receive the alert even when one or more alert conditions specified for that alert have been satisfied. Alert definition module 117 may store alert definitions in alert database 138 and/or any other database linked to computer 110.

Those having skill in the art will recognize that computer 110 and content consumer device 130 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 130. In one implementation, computer 110 and consumer device 130 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
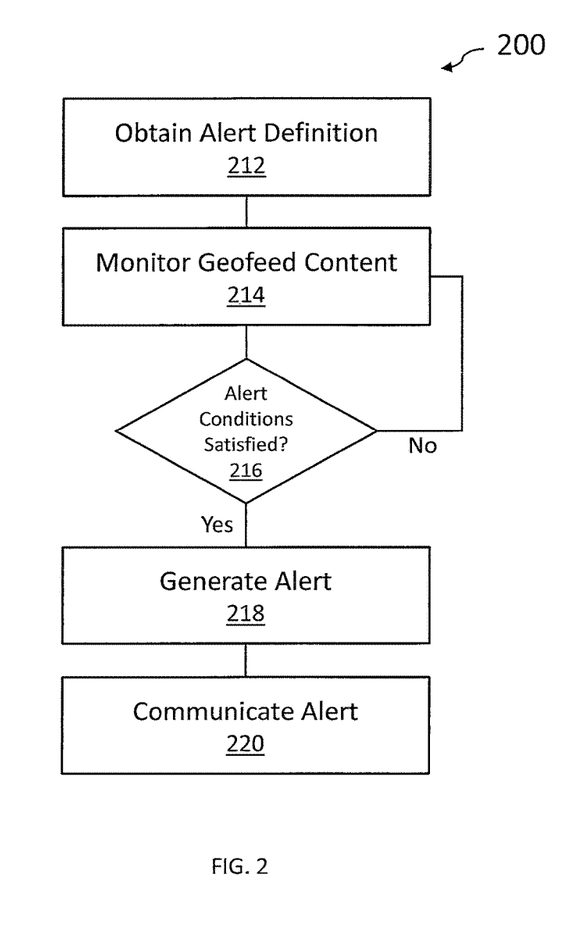
FIG. 2 illustrates a process for generating a geofeed-based alert, according to an aspect of the invention.

FIG. 2 illustrates a process 200 for generating a geofeed-based alert, according to an aspect of the invention. The various processing operations and/or data flows depicted in FIG. 2 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 212, process 200 may include obtaining an alert definition that identifies one or more geofeeds to be monitored and includes one or more alert conditions that when satisfied cause a geofeed-based alert to be generated for the one or more geofeeds to be monitored. For example, a content consumer may specify, via a user interface, one or more geographically definable locations based on which one or more geofeeds may be identified. One or more alert conditions may include, for example, a volume alert condition which may be satisfied when a particular keyword (e.g., "gun") appears in the geofeed content.

In an operation 214, process 200 may include monitoring the geofeed content based on the one or more alert conditions included in the alert definition obtained in operation 212. In other words, process 200 may include monitoring the geofeed content to determine whether the one or more alert conditions have been satisfied.

In an operation 216, process 200 may include determining whether the one or more alert conditions have been satisfied. For example, where the alert definition includes a volume alert condition, process 200 may determine that the volume alert condition has been satisfied when there is an increase (and/or spike) in the volume of geofeed content (e.g., the number of social media posts) in a certain location related to the one or more geofeeds being monitored. Moreover, where the alert definition includes a plurality of alert conditions, process 200 may check each one of the alert conditions has been satisfied. If process 200 determines that not all of the alert conditions have been satisfied, process 200 may return to operation 214 to continuously monitor the geofeed content. On the other hand, if process 200 determines that the one or more alert conditions have been satisfied, process 200 may proceed to the next operation.

In an operation 218, process 200 may include generating a geofeed-based alert. In an operation 220, process 200 may include communicating the geofeed-based alert. The geofeed-based alert may be communicated via one or more communication channels such as, for example, SMS text, email, content delivered to a client application such as a mobile application, a website, and/or other communication channel. In some embodiments, the geofeed-based alert may be communicated via a user interface such as a web page, mobile application, and/or other interface.

Figure 3:
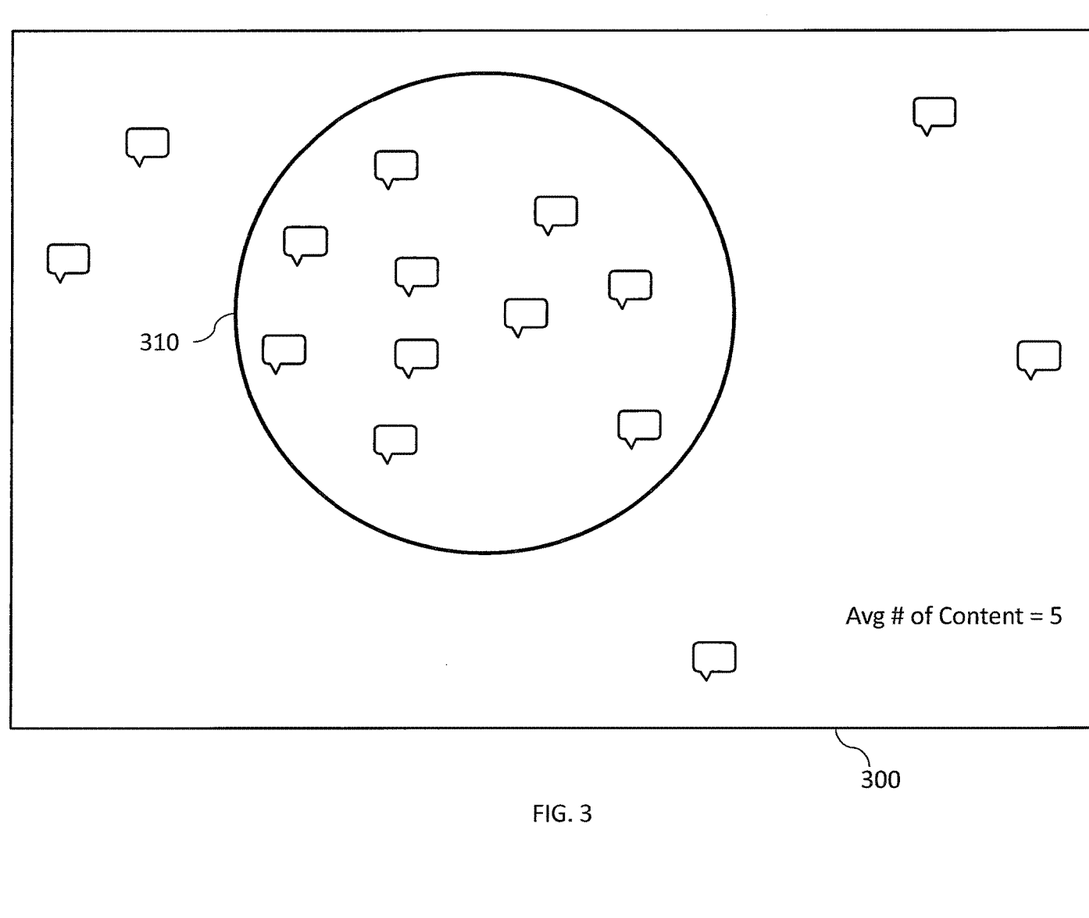
FIG. 3 illustrates a screenshot of an interface for communicating a geofeed-based alert generated based on a volume alert condition, according to an aspect of the invention.

FIG. 3 illustrates a screenshot of an interface 300 for communicating a geofeed-based alert generated based on a volume alert condition, according to an aspect of the invention. The screenshots illustrated in FIG. 3 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 300 and other interfaces described herein may be implemented as a web page communicated from computer 110 to a client, an application such as a mobile application executing on the client that receives generates the interface based on information communicated from computer 110, and/or other interface. Whichever type of interface is used, computer 110 may communicate the data and/or formatting instructions related to the interface to the client, causing the client to generate the various interfaces of FIG. 4 and other drawing figures. Furthermore, computer 110 may receive data from the client via the various interfaces, as would be appreciated.

Referring to FIG. 3, interface 300 may provide a geofeed-based alert that may be generated when alert module 112 detects an increase (e.g., spike) or a decrease in the volume of geofeed content (e.g., the number of content items). As illustrated, a circle 310 having a radius and center (not illustrated) is displayed that indicates a boundary of a geofeed. As illustrated, there are 10 content items within the geofeed illustrated by circle 310. Since the current level of activity measured by counting the number of newly available geofeed content items for the past hour (e.g., 10 content items per hour) exceeds the historical activity level (e.g., 5 content items per hour), the activity-based alert condition may be satisfied, causing a geofeed-based alert to be generated.

Figure 4:
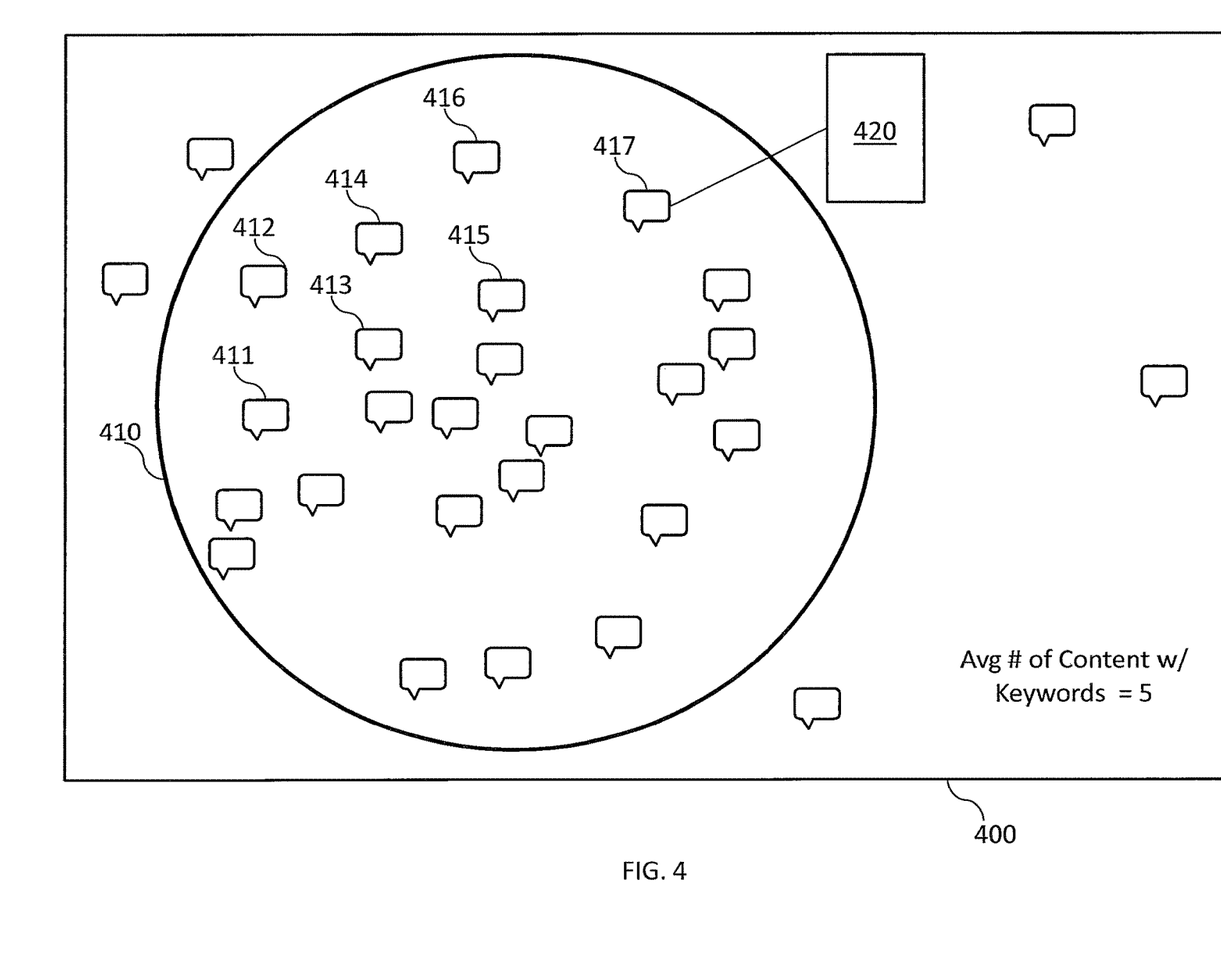
FIG. 4 illustrates a screenshot of an interface for communicating a geofeed-based alert generated based on a subject matter alert condition, according to an aspect of the invention.

FIG. 4 illustrates a screenshot of an interface 400 for communicating a geofeed-based alert generated based on a subject matter alert condition, according to an aspect of the invention.

Referring to FIG. 4, interface 400 may provide a geofeed-based alert that may be generated when alert module 112 detects an increase (and/or spike) in the usage of a particular keyword (or set of keywords). As illustrated, a circle 410 having a radius and center (not illustrated) is displayed that indicates a boundary of a geofeed. As illustrated, there are 7 content items (e.g., content elements 411-417) within the geofeed illustrated by circle 410, all of which include a particular keyword 420 (e.g., "gun"). Since the current keyword frequency (e.g., 7 content items with the keyword "gun" per day) exceeds the historical keyword frequency (e.g., 5 content items per day), the subject matter alert condition may be satisfied, causing a geofeed-based alert to be generated.

Although FIG. 4 has been described with respect to providing an alert based on an increase or spike in activity, an alert may be generated based on an increase, a decrease, and/or steady-state in activity. For example, an entity may wish to know when a number of social media and/or other content have decreased, potentially indicating a loss of interest in a location such as a retail store or a point of interest. An entity may also wish to know when a number of content is not increasing (or decreasing) and generally remaining the same or within a predefined range. This may indicate that a promotion expected to increase content being posted about a location is not working, for example.

Figure 5:
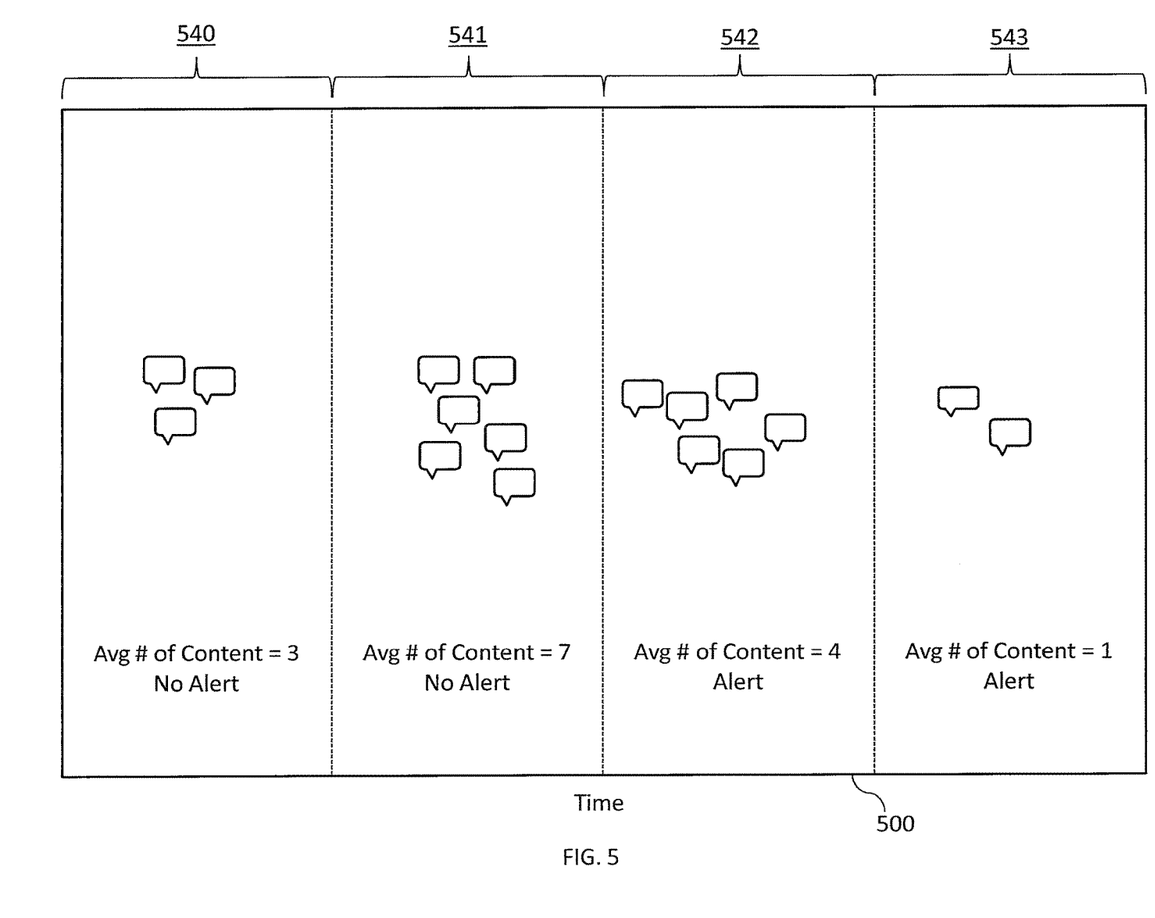
FIG. 5 illustrates a screenshot of an interface for communicating a geofeed-based alert generated based on a plurality of alert conditions including a temporal alert condition and a volume alert condition, according to an aspect of the invention.

FIG. 5 illustrates a screenshot of an interface 500 for communicating a geofeed-based alert generated based on a plurality of alert conditions including a temporal alert condition and a volume alert condition, according to an aspect of the invention.

Referring to FIG. 5, interface 500 may provide a geofeed-based alert that may be generated when alert module 112 detects an increase (and/or spike) in the volume of geofeed content (e.g., the number of social media posts) during a specified time period. As illustrated, there are 3 content items within a particular geofeed being monitored during a time segment 540 (e.g., 9:00 AM to 10:00 AM). Since the current level of activity measured by counting the number of newly available geofeed content items posted during time segment 540 (e.g., 3 content items per hour) equals to, therefore does not exceed, the historical activity level (e.g., 3 content items per hour), no alert may be generated. Similarly, during a time segment 541 (e.g., 10:00 AM to 11:00 AM), no alert may be generated since the current level of activity (e.g., 6 content items per hour) is below the historical activity level (e.g., 7 content items per hour). In another example, there are 6 content items within a particular geofeed being monitoring during a time segment 542 (e.g., 11:00 AM to 12:00 PM). Since the current level of activity (e.g., 6 content items per hour) exceeds the historical activity level (e.g., 4 content items per hour), both temporal alert condition and volume alert condition may be satisfied, causing a geofeed-based alert to be generated. Similarly, during a time segment 543 (e.g., 12:00 PM-1:00 PM), a geofeed-based alert may be generated since the current level of activity (e.g., 2 content items per hour) exceeds the historical activity level (e.g., 1 content item per hour).

Figure 6:
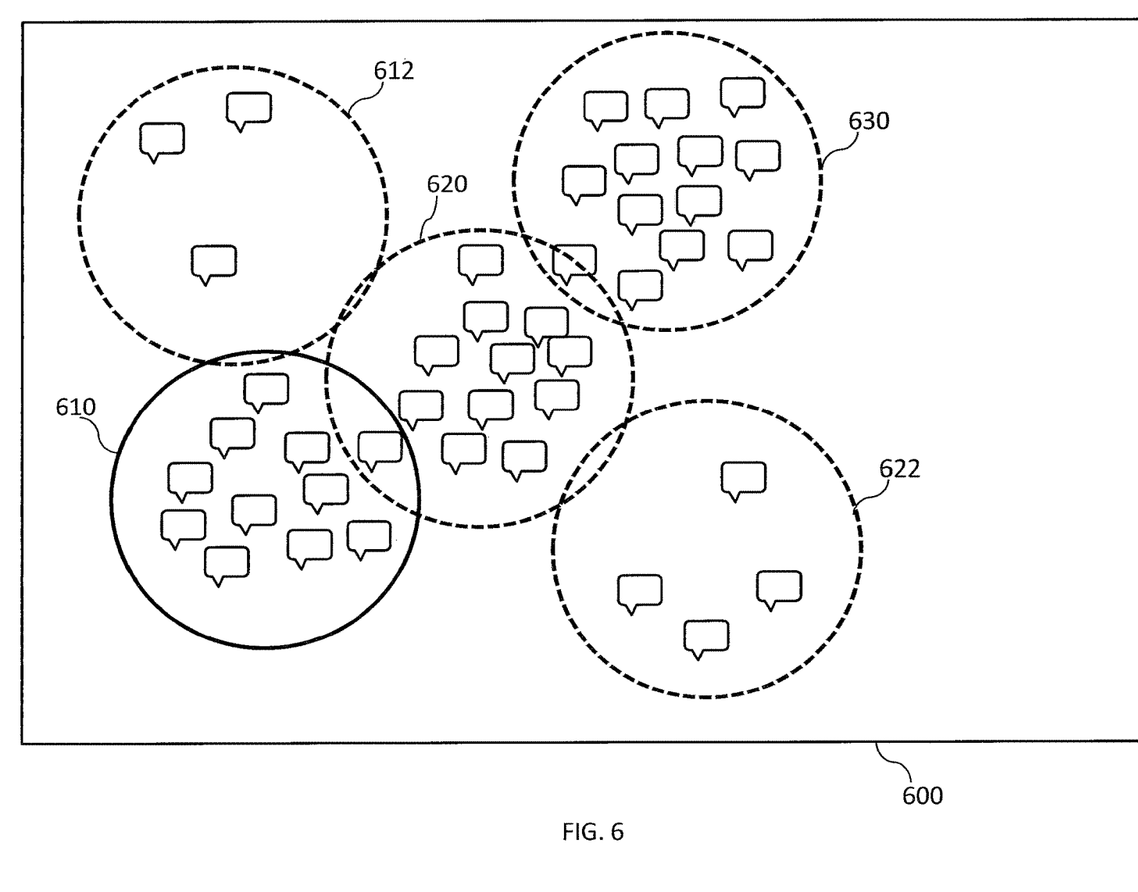
FIG. 6 illustrates a screenshot of an interface for displaying motion of geofeed content over time, according to an aspect of the invention.

FIG. 6 illustrates a screenshot of an interface 600 for displaying motion of geofeed content over time, according to an aspect of the invention.

Referring to FIG. 6, interface 600 may display a plurality of geofeeds 610, 620, and 630 that indicate certain motion of geofeed content. For example, a geofeed 610 may be identified when tracking module 113 detects a spike in the usage of a particular keyword (or set of keywords) (e.g., "storm") within geofeed 610. Tracking module 113 may then sample around geofeed 610 to identify other geofeeds (e.g., geofeeds 612, 620, and 622) that exist nearby geofeed 610 and determine whether any of the identified geofeeds also indicates a spike in the keyword usage. For example, when the frequency of usage of the keyword "storm" for a geofeed 620 increases by a predetermined percentage relative to its historical keyword frequency (e.g., the average number of social media posts with the keyword "storm" per day for the past 30-day period), tracking module 113 may select geofeed 620 as the next geofeed to "track." Similarly, tracking module 113 may sample around geofeed 620 to identify other nearby geofeeds and determine whether any of the nearby geofeeds also indicates a spike in the keyword usage. In this example, a geofeed 630 may be identified to indicate a spike in the keyword usage. As illustrated, geofeeds 610, 620 and 630 may be displayed to communicate "motion" of geofeed content that is moving along a certain path of locations.

Figure 7:
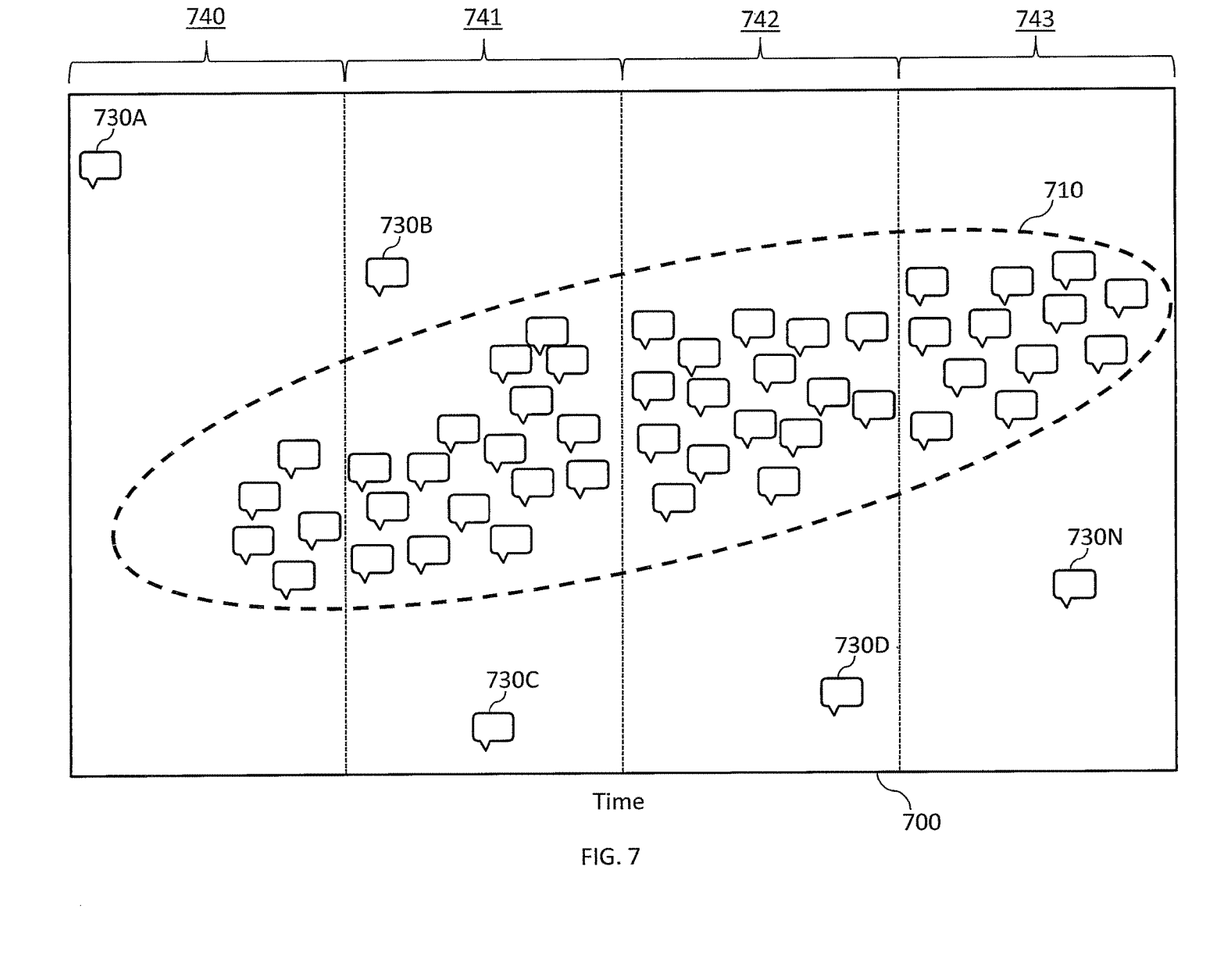
FIG. 7 illustrates a screenshot of an interface for displaying motion of geofeed content over time, according to an aspect of the invention.

FIG. 7 illustrates a screenshot of an interface 700 for displaying motion of geofeed content over time, according to an aspect of the invention.

Referring to FIG. 7, interface 700 may display multiple snapshots (and/or views) of a geographical region, each of the snapshots corresponding to individual ones of a plurality of consecutive time segments (e.g., time segments 740-743). For example, when it is determined that there is an increase in the volume of content in the original geofeed being tracked in a time segment 740, tracking module 113 may identify a bigger geographical region that covers the original geofeed and capture a snapshot of content distribution of the region in a time segment 741, another snapshot in a time segment 742 and so on. Using these time-based snapshots of content distribution, tracking module 113 may determine that there is a spike in the activity level (e.g., an increase in the volume of content) in one subsection of the region in time segment 741, another spike in another subsection of the region in time segment 742 and so on. Content items 730A-N may indicate outliers and may be disregarded. As illustrated, an oval 710 may be displayed to indicate "motion" of geofeed content over time.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for generating geofeed-based alerts, the system comprising:
a computer comprising one or more physical processors programmed by one or more computer program instructions that, when executed, program the one or more physical processors to:
obtain an alert parameter that specifies an alert condition that, when satisfied, causes an alert to be generated;
format a first request for social media content items created at a geographically definable location specifically for a first social media content provider;
format a second request for social media content items created at the geographically definable location specifically for a second social media content provider;
transmit the first request to the first social media content provider via a network;
transmit the second request to the second social media content provider via the network;
obtain a set of social media content items from multiple social media content providers, wherein one or more of the set of social media content items are obtained from the first social media content provider responsive to the first request and one or more of the set of social media content items are obtained from the second social media content provider responsive to the second request, the set of social media content items including at least a first social media content item created by a first user and a second social media content item created by a second user;
determine whether the set of social media content items satisfy the alert condition;
generate an alert responsive to a determination that at least the first social media content item and the second social media content item of the set of social media content items satisfy the alert condition; and cause a notification that includes the alert to be communicated via a network.

2. The system of claim 1, wherein the alert parameter comprises a subject matter alert parameter that specifies a subject matter alert condition, and wherein the one or more physical processors are further programmed to:
determine that the first social media content item and the second social media content item include subject matter that satisfies the subject matter alert condition.

3. The system of claim 2, wherein to determine that the first social media content item and the second social media content item include subject matter that specifies the subject matter alert condition, the one or more physical processors are further programmed to:
determine whether a keyword specified by the subject matter alert parameter is included in the first social media content item and the second social media content item.

4. The system of claim 1, wherein the alert parameter comprises a volume alert parameter that specifies a threshold volume of a volume alert condition, and wherein the one or more physical processors are further programmed to:
determine that a volume of the first social media content item and the second social media content item exceeds the threshold volume, satisfying the volume alert condition.

5. The system of claim 4, wherein the one or more physical processors are further programmed to:
automatically determine the threshold volume based on a historical volume of content.

6. The system of claim 1, wherein the alert parameter comprises a temporal alert parameter that specifies a temporal alert condition, and wherein the one or more physical processors are further programmed to:
determine that the first social media content item and the second social media content item are related to a time specified by the temporal alert parameter, satisfying the temporal alert condition.

7. A method for generating geofeed-based alerts, the method being implemented on a computer system having one or more physical processors programmed by one or more computer program instructions that, when executed, program the one or more physical processors to perform the method, the method comprising:
obtaining, by the computer system, an alert parameter that specifies an alert condition that, when satisfied, causes an alert to be generated;
formatting, by the computer system, a first request for social media content items created at a geographically definable location specifically for a first social media content provider;
formatting, by the computer system, a second request for social media content items created at the geographically definable location specifically for a second social media content provider;
transmitting, by the computer system, the first request to the first social media content provider via a network;
transmitting, by the computer system, the second request to the second social media content provider via the network;
obtaining, by the computer system, a set of social media content items from multiple social media content providers, wherein one or more of the set of social media content items are obtained from the first social media content provider responsive to the first request and one or more of the set of social media content items are obtained from the second social media content provider responsive to the second request, the set of social media content items including at least a first social media content item created by a first user and a second social media content item created by a second user;
determining, by the computer system, whether the set of social media content items satisfy the alert condition;
generating, by the computer system, an alert responsive to a determination that at least the first social media content item and the second social media content item of the set of social media content items satisfy the alert condition; and
causing, by the computer system, a notification that includes the alert to be communicated via a network.

8. The method of claim 7, wherein the alert parameter comprises a subject matter alert parameter that specifies a subject matter alert condition, the method further comprising:
determining, by the computer system, that the first social media content item and the second social media content item include subject matter that satisfies the subject matter alert condition.

9. The method of claim 8, wherein determining that the first social media content item and the second social media content item include subject matter that satisfies the subject matter alert condition comprises:
determining, by the computer system, whether a keyword specified by the subject matter alert parameter is included in the first social media content item and the second social media content item.

10. The method of claim 7, wherein the alert parameter comprises a volume alert parameter that specifies a threshold volume of a volume alert condition, the method further comprising:
determining, by the computer system, that a volume of the first social media content item and the second social media content item exceeds the threshold volume, satisfying the volume alert condition.

11. The method of claim 10, the method further comprising:
automatically determining, by the computer system, the threshold volume based on a historical volume of content.

12. The method of claim 7, wherein the alert parameter comprises a temporal alert parameter that specifies a temporal alert condition, the method further comprising:
determining, by the computer system, that the first social media content item and the second social media content item are related to a time specified by the temporal alert parameter, satisfying the temporal alert condition.

13. The system of claim 1, wherein to format the first request for social media content items specifically for the first social media content provider, the one or more physical processors are further programmed to:
access a stored first content provider profile comprising a first input format rule that describes how to request content from the first social media content provider, wherein the first request for social media content items is formatted based on the first input format rule.

14. The system of claim 1, wherein the first request comprises a specification of the geographically definable location in a predefined format, and wherein to format the first request for social media content items specifically for the first social media content provider, the one or more processors are further programmed to:
generate a specification of the geographically definable location in a predefined format for requesting content from at least the first social media content provider, wherein the formatted first request includes the specification of the geographically definable location in the predefined format.

15. The system of claim 1, wherein the alert parameter further indicates that multiple social media content items must satisfy the alert condition to cause the alert to be generated.

16. The method of claim 7, wherein formatting the first request for social media content items specifically for the first social media content provider comprises:
   accessing, by the computer system, a stored first content provider profile comprising a first input format rule that describes how to request content from the first social media content provider, wherein the first request for social media content items is formatted based on the first input format rule.

17. The method of claim 7, wherein the first request comprises a specification of the geographically definable location in a predefined format, and wherein formatting the first request for social media content items specifically for the first social media content provider comprises:
   generating, by the computer system, a specification of the geographically definable location in a predefined format for requesting content from at least the first social media content provider, wherein the formatted first request includes the specification of the geographically definable location in the predefined format.

18. The method of claim 7, wherein the alert parameter further indicates that multiple social media content items must satisfy the alert condition to cause the alert to be generated.

\* \* \* \* \*